Nov. 30, 1948.  J. E. BUXTON  2,455,327
ENGINE STARTER GEARING
Filed Nov. 27, 1946
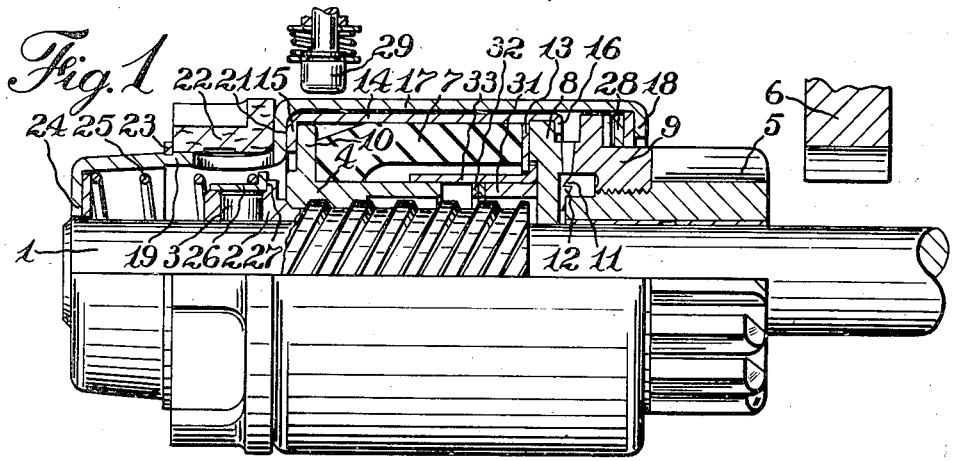
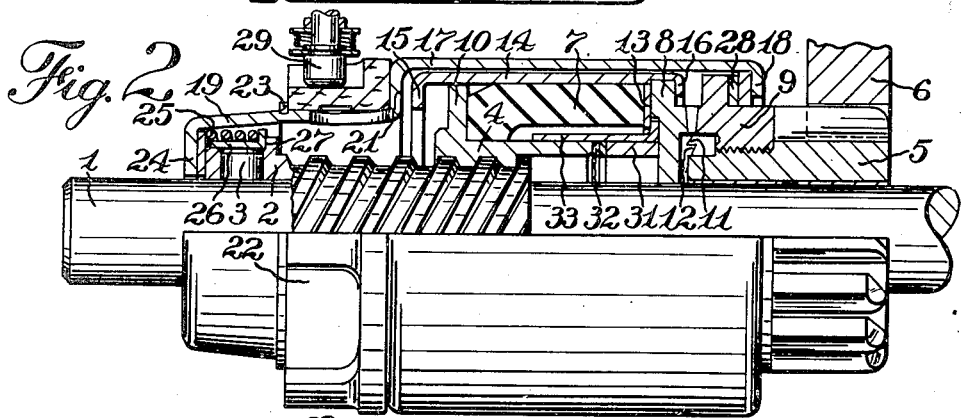
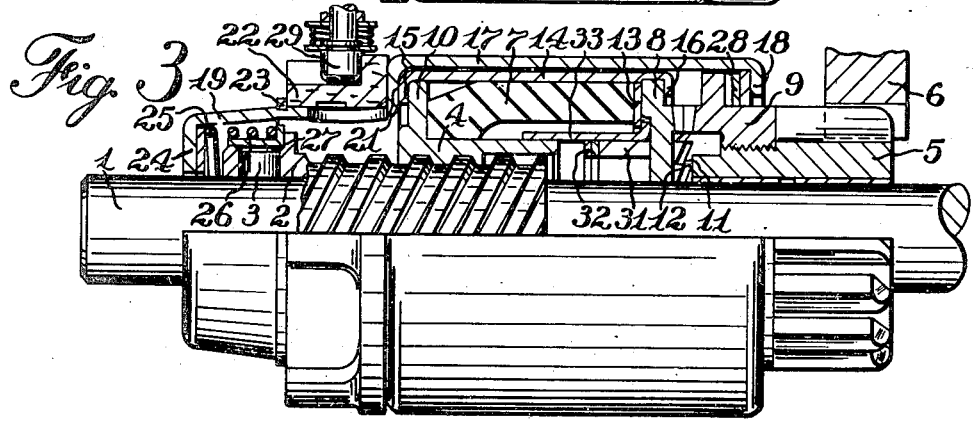
INVENTOR.
James E. Buxton
ATTORNEY Patented Nov. 30, 1948

2,455,327

UNITED STATES PATENT OFFICE 2,455,327

ENGINE STARTER GEARING

James E. Buxton, Elmira, N. Y., assignor to Bendix Aviation Corporation, a corporation of Delaware Application November 27, 1946, Serial No. 712,546

9 Claims. (Cl. 74—7)

The present invention relates to engine starter gearing and more particularly to an automatically engaging drive of the "anti-kickout" type which is adaptable without alteration for either inboard or outboard installation.

It is an object of the present invention to provide a novel starter drive of the above character which is reliable in operation, simple in construction, and readily assembled either as an inboard or an outboard drive.

It is another object to provide such a device incorporating a yielding transmission member of elastically deformable material which is positively held under a predetermined degree of initial compression.

It is another object to provide such a device embodying a dental type of overrunning clutch with means for positively closing the clutch during cranking while permitting the clutch to overrun freely when the engine fires.

It is another object to provide such a device incorporating an inner barrel enclosing the yielding transmission member and holding it under initial compression, and an outer barrel enclosing the inner barrel and overrunning clutch, and forming a stop for defining the meshing position of the pinion.

Further objects and advantages will be apparent from the following description taken in connection with the accompanying drawing, in which:

Fig. 1 is a side elevation partly broken away and in section of a preferred embodiment of the invention showing the parts in idle position;

Fig. 2 is a similar view showing the parts in cranking position; and

Fig. 3 is a similar view showing the parts in the positions assumed when the engine fires and the pinion overruns the starting motor while being maintained in mesh with the engine gear.

In Fig. 1 of the drawing, there is illustrated a power shaft 1 which is preferably the extended armature shaft of a starting motor not illustrated. A screw shaft 2 is fixedly mounted on the power shaft as by means of a cross pin 3, and has threaded thereon a flanged control nut 4. A pinion 5 is slidably journalled on the power shaft for longitudinal movement into and out of mesh with a gear 6 of the engine to be started, and means for actuating the pinion from the control nut is provided comprising a cylindrical block 7 of elastically deformable material such as rubber, seated at one end on the control nut against the flange 10 thereof, and at its other end bearing against an annular driving clutch member 8 which is slidably journalled on the power shaft 1 adjacent the pinion 5.

A driven clutch member 9 is fixedly mounted on the pinion 5 in any suitable manner, and is provided with ratchet teeth 11 which are adapted to engage corresponding teeth 12 on the driving clutch member to form a positive driving connection therebetween in the forward direction of rotation but to disengage when the pinion overruns the driving clutch member.

The rubber block 7 is arranged to form a yielding frictional driving connection between the control nut 4 and the driving clutch member 8. For this purpose, the block 7 may bear directly on said clutch member or a friction washer 13 may be interposed therebetween if deemed desirable. The assembly of the control nut 4, elastic block 7, washer 13, and driving clutch member 8 is held under suitable initial compression by a barrel member 14 having a flange 15 at one end which engages the flange 10 of the control nut 4 and is spun over at its other end as indicated at 16 to retain the driving clutch member 8 therein.

Means for limiting the longitudinal movement of the pinion 5 in order to define its meshed position is provided comprising a barrel member 17 having an inturned flange 18 at one end which surrounds the driven clutch member 9 and provides an abutment therefor. The barrel 17 is provided with a reduced portion 19 forming a shoulder 21 acting as an abutment for the flange 15 of the inner barrel 14, and a latch ring 22 is journalled on said reduced portion between the shoulder 21 and a lock ring 23. The barrel 17 terminates with an inturned flange 24 which loosely surrounds the power shaft 1, and forms an abutment adapted to engage the adjacent end of the screw shaft 2 to limit the longitudinal movement of the barrel and consequently of the pinion 5. Yielding means for urging the barrel 17 toward idle position, as shown in Fig. 1, is provided in the form of an anti-drift spring 25 arranged to bear against flange 24 of the barrel at one end while its opposite end is seated on a flanged ring 26. Ring 26 bears against a stop shoulder 27 on the screw shaft and serves both as an abutment for the anti-drift spring, and as a retainer for the pin 3 in the screw shaft.

In order to yieldingly press together the overrunning clutch members 8 and 9, a compression spring 28 in the form of a split washer is located between the driven clutch member 9 and the adjacent flange of the barrel 18. Spring 28 serves to urge the driven clutch member into initial engagement with the driving clutch member 8, and when compressed flat by the driving pressure during cranking, it serves as an anti-friction washer between the driven clutch member and the barrel flange.

Means for limiting the compression of the elastic block 7 is provided in the form of an abutment ring 31 located between the control nut 4 and the driving clutch member, anti-friction thrust washers 32 being preferably interposed to eliminate any tendency for the parts to stick or jam. The thimble 33 is preferably held against the driven clutch member by engagement with the inner edge of the friction ring 13. The length of the abutment ring 31 is so chosen that the control nut 4 is permitted to compress the elastic member 7 sufficiently to cause the friction clutch formed by the ring 13 and clutch members 8 to transmit the desired maximum torque. When this torque is exceeded, slippage will take place between the ring and clutch member so as to protect the parts from excessive stress.

A thimble 33 having a telescopic relation with the control nut 4 and bearing against the driving clutch member 8 serves to prevent lubricant on the screw shaft from reaching the elastic member 7.

Manually controllable means are provided for holding the drive in mesh with the engine gear until the operator is satisfied that the engine is reliably self-operative. As here shown, this means comprises a plunger 29 mounted adjacent the periphery of the outer barrel 17 and arranged to be projected into engagement therewith and to seat itself in the latch ring 22 when the parts are in cranking position as shown in Fig. 2. This plunger is preferably an extension of the solenoid plunger for the starter switch as illustrated in the patent to Oliver No. 2,444,109, issued June 29, 1948, assigned to the assignee of the present application, and when it is engaged with the latch ring it prevents withdrawal of the pinion 5 out of mesh with the engine gear 6, as shown in Fig. 3.

In operation, starting with the parts in the positions illustrated in Fig. 1, energization of the starting motor causes the power shaft 1 to rotate, and at the same time the plunger 29 is brought into frictional engagement with the periphery of the outer barrel 17 whereby the rotation of the power shaft causes the control nut 4 to move longitudinally to the right, which motion is transmitted through the elastic block 7 and the clutch members 8, 9 to the pinion 5 to move it into mesh with the engine gear 6. When the flange 24 of the outer barrel 17 engages the end of the screw shaft 2, the longitudinal movement of the outer barrel is arrested, and clutch spring 28 is compressed flat, after which the elastic block 7 is compressed until sufficient torque is built up to start the engine gear 6 in rotation. If the initial torque due to the deceleration of the armature of the starting motor and the parts of the transmission exceeds a predetermined maximum, the elastic block 7 is compressed until the end of the control nut 4 engages the thrust washer whereupon further compression of the block is prevented and excessive torque loads may be dissipated by slippage between the friction ring 13 and the driving clutch member 8.

When the engine fires, the acceleration of the pinion by the engine gear causes the pinion to overrun the drive, while being maintained in mesh with the engine gear by the engagement of the plunger 29 in the latch ring 22, so that cranking will be resumed if the engine fails to continue self-operative.

When the engine is properly started, the operator deenergizes the starting system, at the same time withdrawing the latch plunger 29, whereupon the parts are returned to idle position by the combined action of the anti-drift spring 25 and the torque frictionally transmitted through the overrunning clutch from the pinion to the control nut.

Although but one form of the invention has been described in detail, it will be understood that other embodiments are possible and that changes may be made in the design and arrangement of the parts without departing from the spirit of the invention as defined in the claims appended hereto.

What is claimed is:

1. In an engine starter drive, a power shaft, a screw shaft fixed thereon, a pinion slidably journalled on the power shaft for movement into and out of mesh with an engine gear, a control nut having a radial flange threaded on the screw shaft, a driving clutch member slidably journalled on the power shaft, a cylinder of elastically deformable material seated on the control nut against said flange, a barrel member surrounding the control nut and clutch member and maintaining the elastic cylinder under compression therebetween, a driven clutch member fixed to the pinion and means including an outer barrel member having abutment means for engaging the end of the screw shaft and limiting the longitudinal movement of the pinion.

2. An engine starter drive as set forth in claim 1 in which the outer barrel has inwardly directed shoulders forming abutments, one of which is arranged to engage the end of the screw shaft to limit the travel of the barrel, and including further yielding means interposed between the driven clutch member and the other shoulder of the barrel, to urge the driven clutch member into engagement with the driving clutch member.

3. An engine starter drive as set forth in claim 1 in which the outer barrel has inwardly directed shoulders at its ends, one shoulder being arranged to engage the end of the screw shaft to limit the travel of the barrel and a compression spring bearing at its ends on said shoulder and said screw shaft to urge the barrel toward idle position.

4. An engine starter drive as set forth in claim 1 in which the outer barrel has inwardly directed shoulders at its ends, one shoulder being arranged to engage the end of the screw shaft to limit the travel of the barrel, a compression spring bearing at its ends on said shoulder and screw shaft to urge the barrel toward idle position, a compression spring between the other shoulder of the barrel and the driven clutch member to urge the driven clutch member into engagement with the driving clutch member, and manually controlled means for arresting the demeshing movement of the barrel.

5. An engine starter drive including a power shaft, a pinion, a yielding overrunning driving connection therebetween including an elastic transmission member, a driving clutch member journalled on the power shaft, means for rotating the elastic member and pressing it against the clutch member to frictionally transmit its rotation thereto, means for limiting the compression of the elastic member in order to cause the friction connection to slip on a predetermined overload, a driven clutch member fixed to the pinion, yielding means urging the driven clutch member into engagement with said driving clutch member, and means for limiting the longitudinal movement of the driven clutch member.

6. An engine starter drive as set forth in claim 5 including further, means for holding the elastic member in frictional engagement with the first mentioned clutch member, and yielding means for pressing the clutch members together to provided frictional drag in the overrunning direction.

7. An engine starter drive as set forth in claim 5 including further, means for holding the elastic member in frictional engagement with the first mentioned clutch member, and yielding means for pressing the clutch members together to provide frictional drag in the overrunning direction; including further, manually controllable means for holding the pinion in mesh with the engine gear and simultaneously reducing the frictional drag of the overrunning clutch members.

8. In an engine starter drive, a power shaft, a screw shaft fixed thereon, a control nut threaded on the screw shaft, a driving clutch member slidably journalled on the power shaft, a block of elastically deformable material seated on the control nut and frictionally engaging the driving clutch member, a barrel member holding the control nut, elastic block and driven clutch member under initial compression, a pinion slidably journalled on the power shaft for longitudinal movement into and out of mesh with a gear of an engine to be started, a driven clutch member fixed to the pinion, yielding means holding the clutch members in initial engagement, and means for positively arresting the travel of the driven clutch member in the meshing direction; and a second yielding means cooperating with said arresting means to press the clutch members together and urge the driven clutch member and pinion toward idle position.

9. In an engine starter drive, a power shaft, a screw shaft fixed thereon, a control nut threaded on the screw shaft, a driving clutch member slidably journalled on the power shaft, a block of elastically deformable material seated on the control nut and frictionally engaging the driving clutch member, a barrel member holding the control nut, elastic block and driven clutch member under initial compression, a pinion slidably journalled on the power shaft for longitudinal movement into and out of mesh with a gear of an engine to be started, a driven clutch member fixed to the pinion, yielding means holding the clutch members in initial engagement, and means for positively arresting the travel of the driven clutch member in the meshing direction; and a second yielding means cooperating with said arresting means to press the clutch members together and urge the driven clutch member and pinion toward idle position, said arresting means including an outer barrel member enclosing the drive and including further manually controllable means for arresting the demeshing movement of the barrel and relieving the clutch members of the pressure of the second yielding means.

JAMES E. BUXTON.

REFERENCES CITED

The following references are of record in the file of this patent:

UNITED STATES PATENTS

| Number | Name | Date |
| --- | --- | --- |
| 2,199,349 | Sekella | Apr. 30, 1941 |
| 2,311,894 | Buxton | Feb. 23, 1943 |
| 2,394,690 | Hood | Feb. 12, 1946 |